Jan. 10, 1933.　　　S. G. HOPKINS　　　1,893,941

ICE CREAM CONE

Filed June 20, 1932

INVENTOR.
SELDEN G. HOPKINS.
BY
ATTORNEY.

Patented Jan. 10, 1933

1,893,941

UNITED STATES PATENT OFFICE

SELDEN G. HOPKINS, OF WASHINGTON, DISTRICT OF COLUMBIA, ASSIGNOR TO MacELHONE METHODS, INC., OF BINGHAMTON, NEW YORK, A CORPORATION OF NEW YORK

ICE CREAM CONE

Application filed June 20, 1932. Serial No. 618,276.

My invention relates to an improvement in ice cream cones and has for its primary object the provision of a holding means in the ordinary cake cone for the ice cream or other frozen serving to be placed therein.

More specifically my invention contemplates the provision on the interior surface of the side walls of the cake cone of a holding means adapted to engage the lower end of the frozen serving placed therein whereby to support the same and to prevent inadvertent displacement or dropping thereof out of the cone if the latter is tipped from its normal vertical position.

Other objects and advantages by way of detail will be apparent as the description proceeds, reference now being had to the figures of the accompanying drawing forming a part of this application and wherein like reference numerals indicate like parts.

Figures 1, 2:
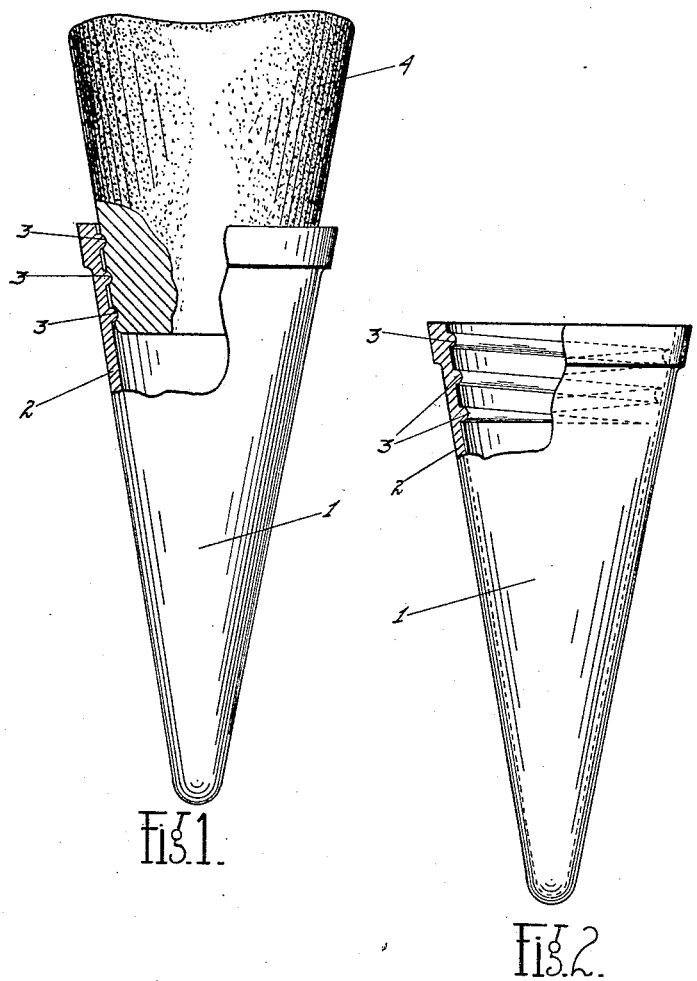
Figure 1 is a side view of an ice cream cone with a frozen serving therein, certain parts being broken away and in section for clearness of illustration.
Figure 2 is a side view of the cake cone embodying my invention, one portion being broken away for clearness.
Figure 3:
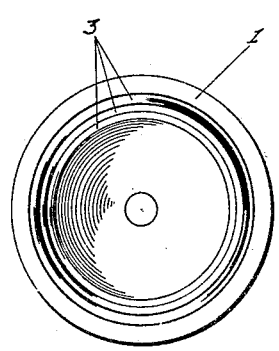
Figure 3 is a top plan view of a cake cone embodying my invention.

The reference character 1 refers generally to a cake cone which may be of the conventional design and type and which has provided on the inner surface of its side walls 2, inwardly protruding beads 3 preferably in the form of a continuous bead provided as a screw thread as illustrated clearly in Figure 2. The beginning of the thread is preferably adjacent the top of the cone 1 and although as many convolutions thereof about the inner surface of the cone may be provided, two or three should be sufficient for all practical purposes.

As is well known, at least the outer surface of the ice cream or other frozen serving 4 is generally softened somewhat by the air reaching it before it is placed in the cone holder 1, and, taking advantage of this, such serving can be placed in the cone and turned slightly as it enters the open end of the cone, resulting in at least partially screwing the serving into the cone by means of the beads 3 acting in the capacity of a screw thread.

Thus not only is the serving 4 securely supported in the cone but held against accidental or inadvertent displacement or dropping out if the cone should be turned on its side or otherwise tipped from its normal vertical position.

The screw beads 3 are preferably molded and baked with the cake cone 1, as an integral part thereof.

It is pointed out that this invention is particularly useful and adaptable with the new form of individual servings molded and frozen separately for use in ice cream cones although the same is also useful with the old type of dipped servings.

Of course, changes may be made in details without departing from the spirit and scope of my invention. I do not limit myself, therefore, to the exact form herein shown and described other than by the appended claims.

I claim:

1. An edible holder for frozen confections characterized by a screw thread on its inner surface.

2. An edible holder for frozen confections characterized by a screw thread on its inner surface, said screw thread being integral with said holder and of the same material.

3. An edible cone shaped holder for frozen confections having an integral inwardly protruding bead in the form of a screw thread on its inner surface adjacent the open end thereof.

In testimony whereof, I affix my signature.

SELDEN G. HOPKINS.